(12) United States Patent
Zhu et al.

(10) Patent No.: US 10,877,926 B2
(45) Date of Patent: Dec. 29, 2020

(54) METHOD AND SYSTEM FOR PARTIAL WAVEFRONT MERGER

(71) Applicants: Advanced Micro Devices, Inc., Santa Clara, CA (US); ATI Technologies ULC, Markham (CA)

(72) Inventors: Yunpeng Zhu, Shanghai (CN); Jimshed Mirza, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 119 days.

(21) Appl. No.: 16/042,592

(22) Filed: Jul. 23, 2018

(65) Prior Publication Data

US 2020/0019530 A1     Jan. 16, 2020

(30) Foreign Application Priority Data

Jul. 11, 2018 (CN) .......................... 2018 1 0758486

(51) Int. Cl.
*G06F 15/80* (2006.01)
*G06F 9/38* (2018.01)

(52) U.S. Cl.
CPC ........ *G06F 15/8084* (2013.01); *G06F 9/3851* (2013.01); *G06F 9/3885* (2013.01); *G06F 9/3887* (2013.01); *G06F 15/8092* (2013.01)

(58) Field of Classification Search
None
See application file for complete search history.

(56) References Cited

U.S. PATENT DOCUMENTS

| 7,617,384 B1* | 11/2009 | Coon ................... G06F 9/3851 712/220 |
| 7,734,676 B2* | 6/2010 | Dritschler ............ G06F 9/5061 709/200 |
| 7,904,905 B2* | 3/2011 | Cervini ................ G06F 9/4843 712/10 |

(Continued)

OTHER PUBLICATIONS

'A Multiple SIMD, Multiple Data (MSMD) Architecture: Parallel Execution of Dynamic and Static SIMD Fragments' by Yaohua Wang et al., copyright 2013 IEEE. (Year: 2013).*

(Continued)

*Primary Examiner* — Steven G Snyder
(74) *Attorney, Agent, or Firm* — Volpe Koenig

(57) ABSTRACT

A method and system for partial wavefront merger is described. Vector processing machines employ the partial wavefront merger to merge partial wavefronts into one or more wavefronts. The system includes a partial wavefront manager and unified registers. The partial wavefront manager detects wavefronts in different single-instruction-multiple-data ("SIMD") units which contain inactive work items and active work items (hereinafter referred to as "partial wavefronts"), moves the partial wavefronts into one or more SIMD unit(s) and merges the partial wavefronts into one or more wavefront(s). The unified register allows each active work item in the one or more merged wavefront(s) to access the previously allocated registers in the originating SIMD units. Consequently, the contents of the unified registers do not have to be copied to the SIMD unit(s) executing the one or merged wavefront(s).

20 Claims, 6 Drawing Sheets

(56) References Cited

U.S. PATENT DOCUMENTS

| | | | |
|---|---|---|---|
| 9,424,099 B2* | 8/2016 | Houston | G06F 9/52 |
| 9,639,371 B2* | 5/2017 | Yazdani | G06F 9/30058 |
| 9,830,164 B2* | 11/2017 | Yazdani | G06F 9/3851 |
| 2003/0005028 A1* | 1/2003 | Dritschler | G06F 9/5061 |
| | | | 718/104 |
| 2005/0108720 A1* | 5/2005 | Cervini | G06F 9/3851 |
| | | | 718/105 |
| 2007/0169042 A1* | 7/2007 | Janczewski | G06F 8/314 |
| | | | 717/149 |
| 2012/0291040 A1* | 11/2012 | Breternitz | G06F 9/5083 |
| | | | 718/104 |
| 2012/0297163 A1* | 11/2012 | Breternitz | G06F 9/4856 |
| | | | 712/22 |
| 2012/0331278 A1* | 12/2012 | Breternitz | G06F 9/5027 |
| | | | 712/236 |
| 2013/0326524 A1* | 12/2013 | Houston | G06F 9/522 |
| | | | 718/102 |
| 2014/0215183 A1* | 7/2014 | Yazdani | G06F 9/3851 |
| | | | 712/24 |
| 2014/0215187 A1* | 7/2014 | Yazdani | G06F 9/3853 |
| | | | 712/206 |
| 2014/0365752 A1* | 12/2014 | Howes | G06F 9/3851 |
| | | | 712/233 |
| 2015/0220345 A1* | 8/2015 | Corbal | G06F 1/3243 |
| | | | 712/214 |
| 2016/0132338 A1* | 5/2016 | Jin | G06F 9/3851 |
| | | | 712/206 |
| 2017/0278213 A1* | 9/2017 | Eckert | G06T 1/60 |

OTHER PUBLICATIONS

Wald, Ingo, "Active Thread Compaction for GPU Path Tracing", Proceedings of the ACM SIGGRAPH Symposium on High Performance Graphics, Aug. 5-7, 2011, pp. 51-58, ACM, New York, NY, USA.

* cited by examiner

METHOD AND SYSTEM FOR PARTIAL WAVEFRONT MERGER

CROSS REFERENCE TO RELATED APPLICATION

This application claims priority to Chinese Patent Application No. 201810758486.3, filed Jul. 11, 2018, the entire contents of which is hereby incorporated by reference as if fully set forth herein.

BACKGROUND

Vector processing machines such as graphics processing units (GPUs), general purpose graphics processing unit (GPGPU) and similar machines use or include one or more parallel processing units configured to perform computations in accordance with a single-instruction-multiple-data ("SIMD") paradigm. In these types of machines, a certain number of the work items constitute a wavefront, which runs in one SIMD unit.

A partial wavefront is a wavefront which includes some work items that are inactive. Partial wavefront are common in applications and lead to lower utilization of the resources constituting the SIMD unit. For example, OpenCl kernels can have complicated branching patterns. In some scenarios, some work items execute down one branch while the remaining work items are inactive. In another scenario, some work items execute down a branch and some other work items execute down another branch. The branches can have different execution times which result in work items with shorter execution times being inactive while work items with longer execution times are executing.

BRIEF DESCRIPTION OF THE DRAWINGS

A more detailed understanding may be had from the following description, given by way of example in conjunction with the accompanying drawings wherein.

DETAILED DESCRIPTION

Described herein is a method and system for partial wavefront merger. Vector processing machines employ the partial wavefront merger to merge partial wavefronts into one wavefront, where a partial wavefront includes some work items that are inactive. This results in higher utilization of computing resources, such as arithmetic logic unit (ALU) utilization, in single-instruction-multiple-data ("SIMD") units. The system includes a partial wavefront manager and a unified register structure. In an implementation, the unified register structure is a unitary register structure. In an implementation, the unitary register structure consists of multiple registers. In an implementation, the unified register structure includes multiple registers, where each register is associated with the ALU or SIMD. In an implementation, each such register consists of multiple registers. For example, but not limited to, the unified register structure can be general purpose registers (GPRs). The partial wavefront manager detects wavefronts in different single-instruction-multiple-data ("SIMD") units which contain inactive work items and active work items (hereinafter referred to as "partial wavefronts"), moves the partial wavefronts into an appropriate number of SIMD(s) and merges the partial wavefronts into one or more wavefront(s). The unified register structure allows each active work-item in the partial wavefronts of the merged wavefronts to access previously allocated registers in the originating SIMD units. Consequently, the contents of the previously allocated registers do not have to be copied to the SIMD(s) executing the merged wavefronts. This is in contrast to software solutions where states of the active work have to be moved from one thread to another thread.

Figure 1:
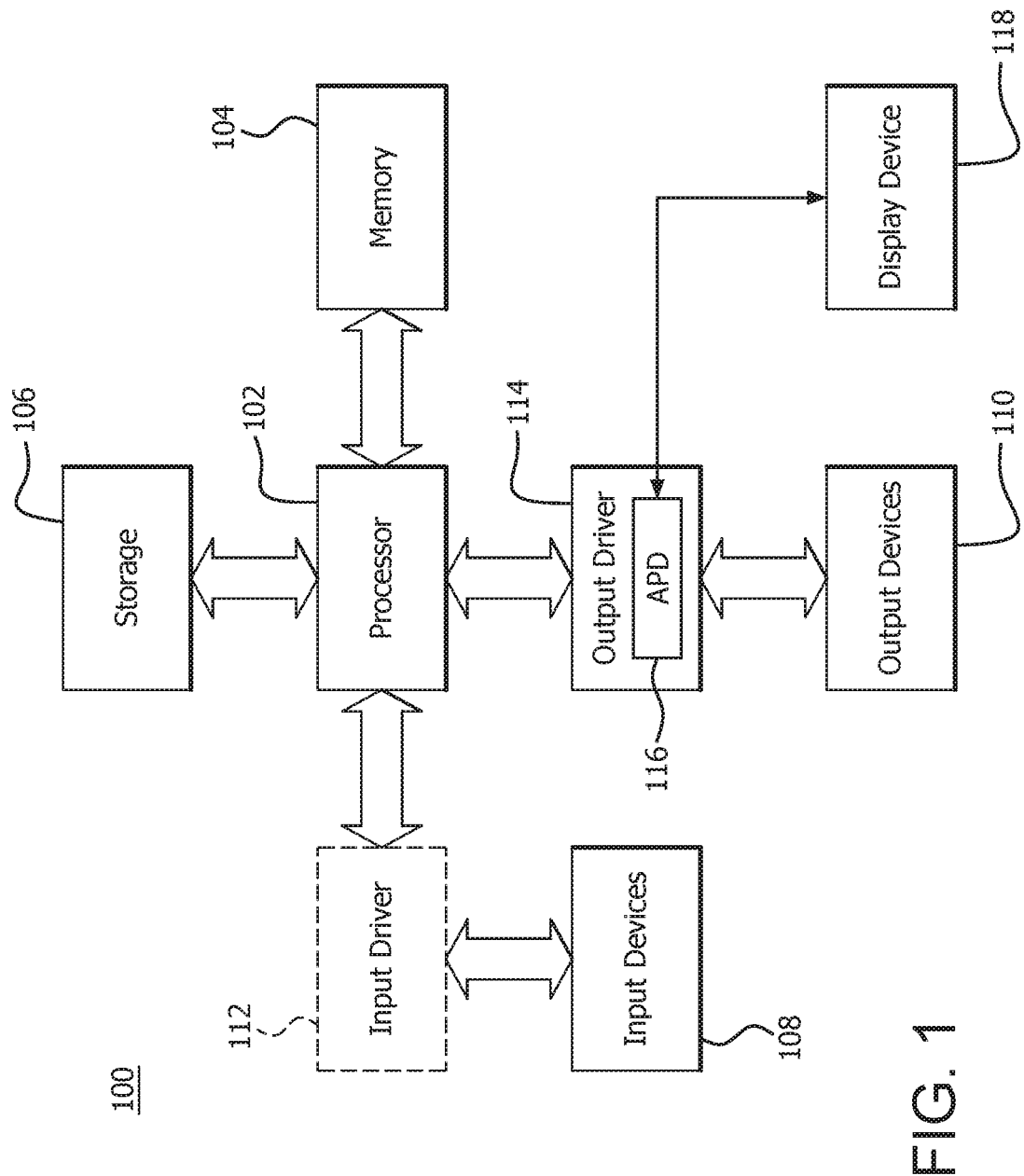
FIG. 1 is a block diagram of an example device in accordance with certain implementations.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile and/or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are, in some cases, not driven by a host processor (e.g., processor 102) and in some implementations configured to provide (graphical) output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
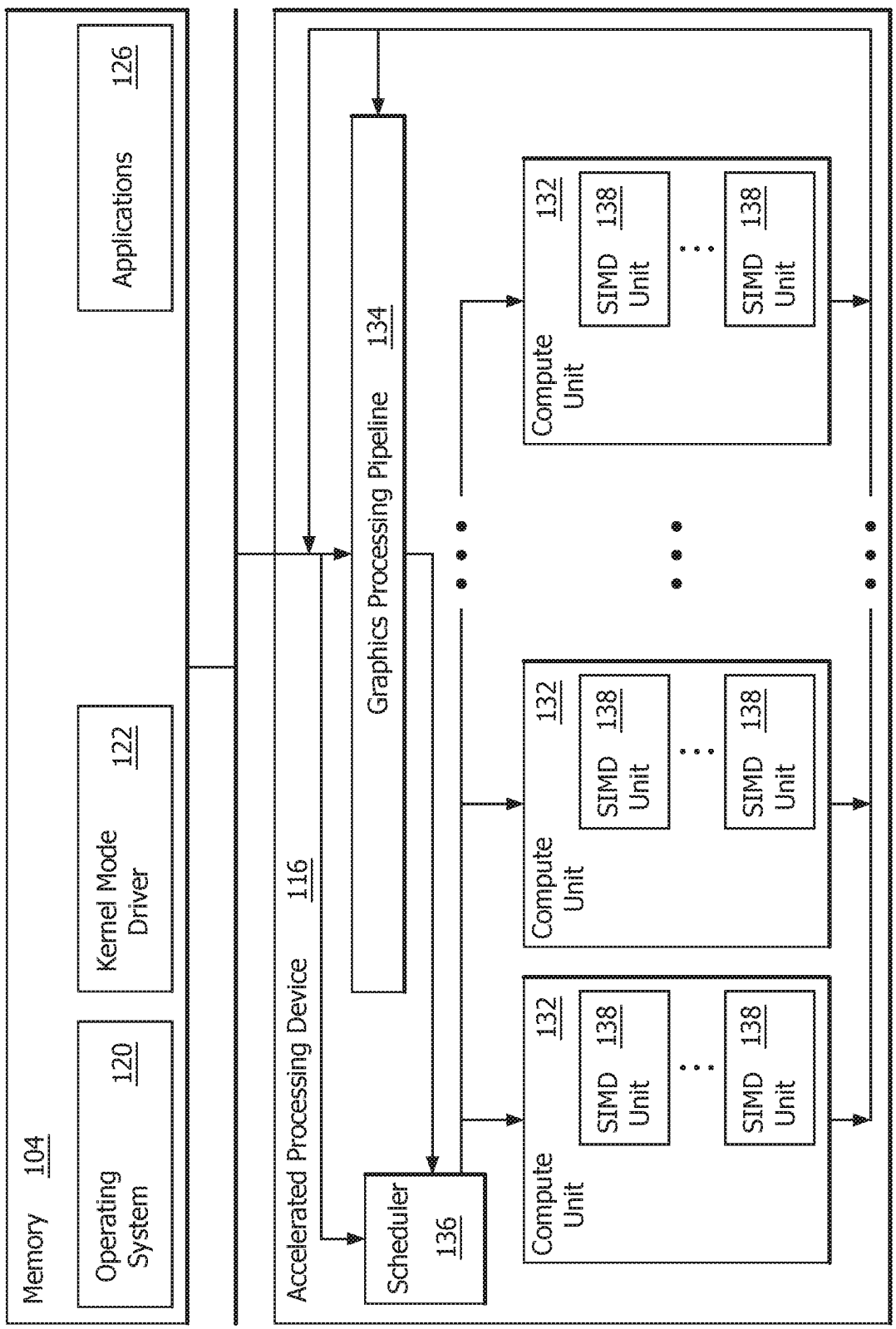
FIG. 2 is a block diagram of the device if FIG. 1 in accordance with certain implementations.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing and/or non-ordered processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. Although the term SIMD unit is used herein, a SIMD unit is a type of processing unit, where the processing unit includes multiple processing elements. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work item. Each work item represents a single instantiation of a program that is to be executed in parallel in a particular lane. Work items can be executed simultaneously as a "wavefront" on a single SIMD processing unit 138. One or more wavefronts are included in a "work group," which includes a collection of work items designated to execute the same program. A work group can be executed by executing each of the wavefronts that make up the work group. In alternatives, the wavefronts are executed sequentially on a single SIMD unit 138 or partially or fully in parallel on different SIMD units 138. A wavefront can be thought of as the largest collection of work items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into two or more wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel. For example, the graphics processing pipeline 134 includes stages that each performs specific functionality. The stages represent subdivisions of functionality of the graphics processing pipeline 134. Each stage is implemented partially or fully as shader programs executing in the programmable processing units, or partially or fully as fixed-function, non-programmable hardware external to the programmable processing units.

The compute units 132 are also used to perform computation tasks not related to graphics or not performed as part of the "normal" operation of the graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
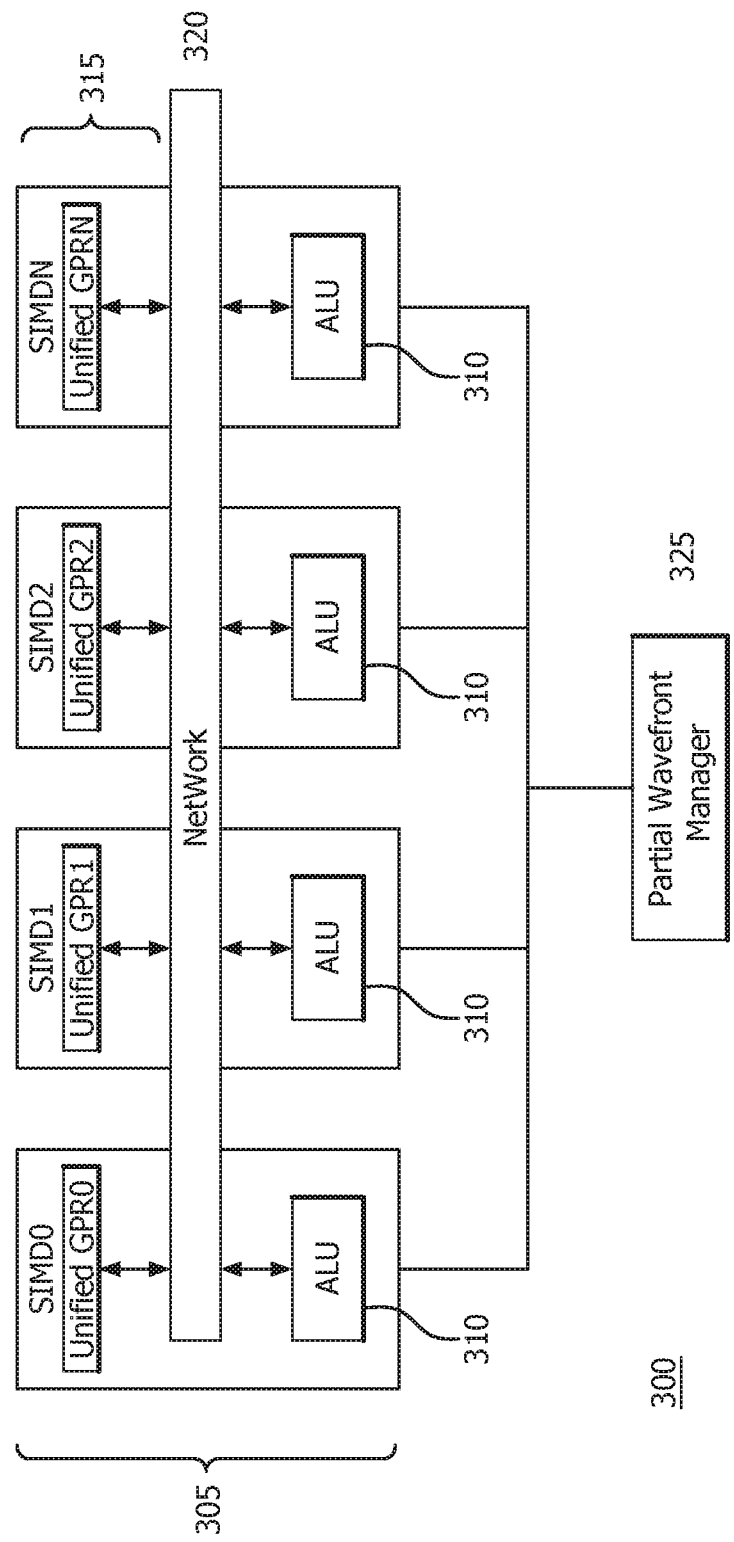
FIG. 3 is a block diagram of a system with a unified register and partial wavefront manager in accordance with certain implementations.

FIG. 3 is a block diagram of a system 300 which performs partial wavefront merging in accordance with certain implementations. System 300 includes SIMD unit(s) 305, for example, SIMD0, SIMD1, SIMD2, . . . , SIMDN, where each SIMD unit(s) 305 includes at least one arithmetic logic unit (ALU) 310. Each of SIMD0, SIMD1, SIMD2, . . . , SIMDN further includes unified GPR(s) 315, for example, unified GPR0, unified GPR1, unified GPR2, . . . , unified GPRN. Each of unified GPR0, unified GPR1, unified GPR2, . . . , unified GPRN and ALUs 310 are connected or in communication (hereinafter collectively "connected") via a network 320. In an implementation, the network 320 is a mesh network. In another implementation, the unified GPRs 315 are connected via a shared bus. In yet another implementation, the unified GPRs 315 are daisy chained together. A partial wavefront manager 325 is connected to each of SIMD0, SIMD1, SIMD2, . . . , SIMDN. The system 300 shown in FIG. 3 is implementable with the systems shown in FIGS. 1 and 2 and the elements presented therein.

The partial wavefront merger feature in the system 300 can be enabled or disabled by one or more register settings. In an implementation, a built-in function is added to an instruction set to set this register setting. The register setting can be set by a driver, shader program, kernel or the like.

As described below with respect to FIGS. 4 and 5, the partial wavefront manager 325 detects the partial wavefronts from the SIMD unit(s) 305 by determining which of the work items (corresponding to SIMD lanes) are active or inactive. The partial wavefront manager 325 can look at any number of SIMD unit(s) 305 for purposes of merging wavefronts. In an implementation, the partial wavefront manager 325 moves the partial wavefronts into one SIMD unit 305 and merges the partial wavefronts into one wavefront, where the SIMD unit 305 can have any combination of active and inactive lanes after the merger. The unified GPR 315 allows each active work item in the merged wavefront to access the previously allocated GPR in the originating SIMD unit. Although the description herein below is with respect to the preceding implementation, the description is applicable to other implementations without departing from the scope of the description. In another implementation, for example, the partial wavefront manager 325 can merge partial wavefronts into multiple SIMD units.

In particular, the partial wavefront manager 325 records a stateId, an execution mask and a program counter for each wavefront in the SIMD unit(s) 305. The stateId indicates the wavefronts which are sharing a particular or specific shader program. The execution mask of each wavefront indicates which work item(s) is active. The program counter indicates which instruction of the shader program is being executed.

Figure 4:
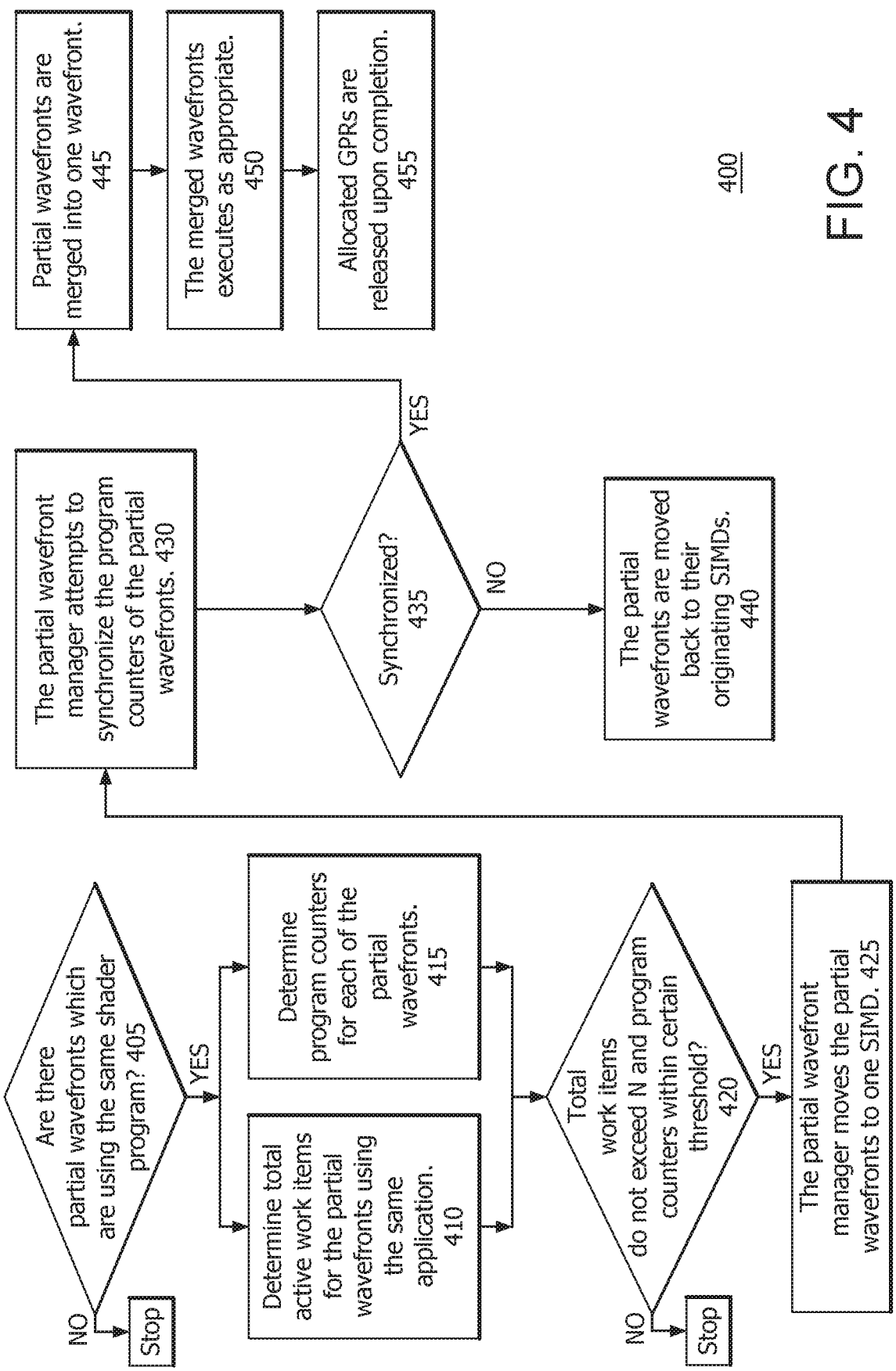
FIG. 4 is a flowchart for partial wavefront merging for the system shown in FIG. 3 in accordance with certain implementations.

FIG. 4 is a flowchart for a method 400 for partial wavefront merging used in conjunction with the system 300 of FIG. 3. As stated herein, the description can be extended to other implementations without departing from the scope of the description. The partial wavefront manager 325 determines which partial wavefronts are candidates for merging. This determination includes determining if there are partial wavefronts which are using the same application, such as for example a shader program (405). If there are none, then no further action is needed. If there are partial wavefronts using the same application, then determine the total active work items for the partial wavefronts using the same application (410) and determine the program counters for each of the partial wavefronts using the same application (415). The partial wavefront manager 325 marks these partial wavefronts as candidates to merge if the total active work items for the partial wavefronts using the same application does not exceed N, where N is the number of active work items that can execute in a wavefront (i.e. the maximum number of lanes in a SIMD unit) and the program counters for each of the partial wavefronts using the same application are within a certain threshold, i.e. within a certain distance, where the program counter threshold is set based on application type, processing optimization and other considerations (420). If both conditions are met, the partial wavefront manager 325 then moves the partial wavefronts to one SIMD unit (425). As described herein, each of the partial wavefronts access their originally allocated unified GPR via the network 320.

The partial wavefront manager 325 then attempts to synchronize the program counter of the partial wavefronts (430). An arbitration algorithm allows one partial wavefront to execute more frequently in order to synchronize the program counters to within a certain synchronization threshold. Synchronization of the program counters are then checked (435). If the program counters fail to synchronize within the certain synchronization threshold then the partial wavefronts are moved back to their originating SIMD units (440). The criteria for setting the synchronization threshold are set based on application type, processing optimization and other considerations. In an implementation, the synchronization can be attempted prior to any merging as described with respect to FIG. 5.

If the program counters are successfully synchronized to within the certain synchronization threshold, then the partial wavefronts are merged into one wavefront (445). The work items inside the merged wavefront run inside the one SIMD unit. As described herein, each of the partial wavefronts and in particular, the work items access their originally allocated GPR via the network 320. The merged wavefront executes as appropriate (450). Once the merged wavefront completes, its allocated GPRs among the SIMD units are released (455).

Figure 5:
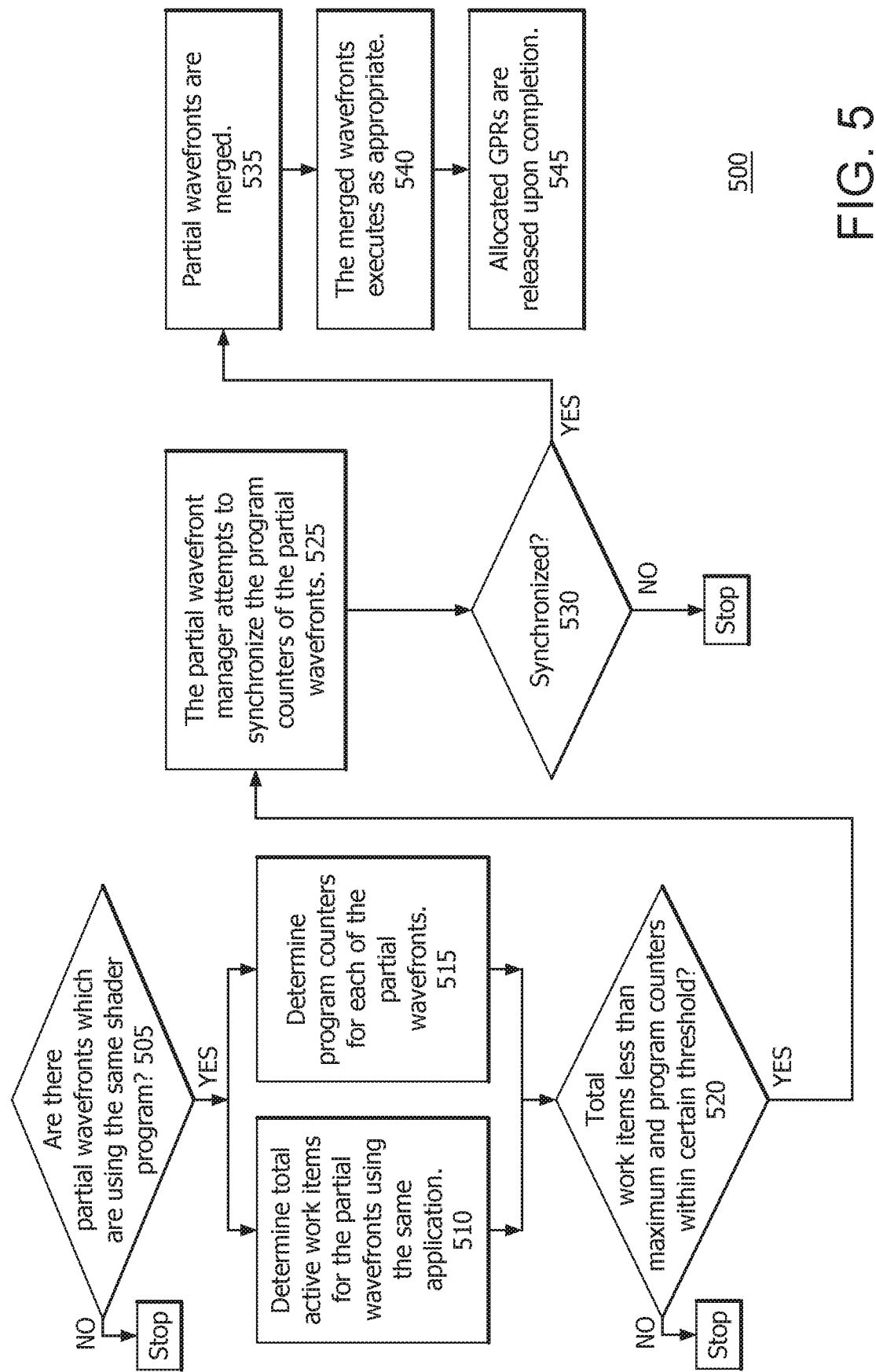
FIG. 5 is a block diagram of another system with a unified register and partial wavefront manager in accordance with certain implementations.

FIG. 5 is a flowchart for a method 500 for partial wavefront merging used in conjunction with the system 300 of FIG. 3. As stated herein, the description can be extended to other implementations without departing from the scope of the description. The partial wavefront manager 325 determines which partial wavefronts are candidates for merging. This determination includes determining if there are partial wavefronts which are using the same application, such as for example a shader program (505). If there are none, then no further action is needed. In an illustrative example, if there are M partial wavefronts using the same application, then determine the total active work items for the M partial wavefronts using the same application (510) and determine the program counters for each of the M partial wavefronts (515), where M partial wavefronts are executing in M different SIMD units. The partial wavefront manager 325 marks these M partial wavefronts as candidates to merge if the total active work items for the M partial wavefronts using the same application does not exceed N*K and K<M, where N is the number of active work items that can execute in a wavefront (i.e. the maximum number of lanes in a SIMD unit), a partial wavefront has a number of active work items less than N, and the program counters for each of the M partial wavefronts using the same application are within a certain threshold, i.e. within a certain distance, where the program counter threshold is set based on application type, processing optimization and other considerations (520). Note that N*M represents the maximum number of work items that can be executed and partial wavefronts exist if K<M. In other words, the total active work items for the M partial wavefronts is less than the maximum number of work items that can be executed for a given number of SIMD units.

The partial wavefront manager 325 then attempts to synchronize the program counters of the M partial wavefronts (525). An arbitration algorithm allows some of the M partial wavefronts to execute more frequently in order to synchronize their program counters with the other partial wavefronts to within a certain synchronization threshold. Synchronization can be implemented using a number of methods. In an implementation, a wavefront is selected with the most advanced program counter (denoted as "wavefront x") and the remaining wavefronts are given higher priority during scheduling so that eventually their program counters will all be in synchronization with wavefront x. The criteria for setting the synchronization threshold are set based on application type, processing optimization and other considerations.

Synchronization of the program counters are then checked (530). If the program counters fail to synchronize within the certain synchronization threshold, then no further action is needed. If the program counters are successfully synchronized to within the certain synchronization threshold, then the partial wavefronts are merged (535). In the illustrative example, if L of M (L<=M) partial wavefronts are able to have the same program counters within a certain time threshold, and the total active work items of the wavefronts does not exceed N*P (P<L), these L partial wavefronts are the candidates to merge. In particular, L partial wavefronts are merged into P wavefronts. The P wavefronts execute in P different SIMD units. As described herein, each of the partial wavefronts and in particular, the work items access their originally allocated GPR via the network 320, for example. The partial wavefronts, e.g., the P wavefronts, execute as appropriate (540). Once the merged wavefronts complete, their allocated GPRs among the SIMD units are released (545).

There are a number of ways to merge the partial wavefronts. In an illustrative example, the work items of (L-P) partial wavefronts are moved into the other P partial wavefronts. There are many methods to divide the L partial wavefronts into P and L-P. For example, select the first P partial wavefronts among the L partial wavefronts. In another example, select the P partial wavefronts from L partial wavefronts arbitrary. In another example, select the P partial wavefronts which have the most active work items. For each partial wavefront in (L-P) wavefronts, move the active items into the selected P partial wavefronts to merge into new P wavefronts. In an implementation, among P wavefronts (P>2), a wavefront can be partial after merging. In an implementation, work items of a partial wavefront can be split and merged with multiple partial wavefronts. For example, if N=8, L is 3, and each wavefront has 5 active work items, then the original wavefronts can be merged into 2 new wavefronts. The 5 work items of one original partial wavefront is split and merged into the 2 new wavefronts. In this instance, one new wavefront has 8 active items and the other wavefront has 7 active items.

Figure 6:
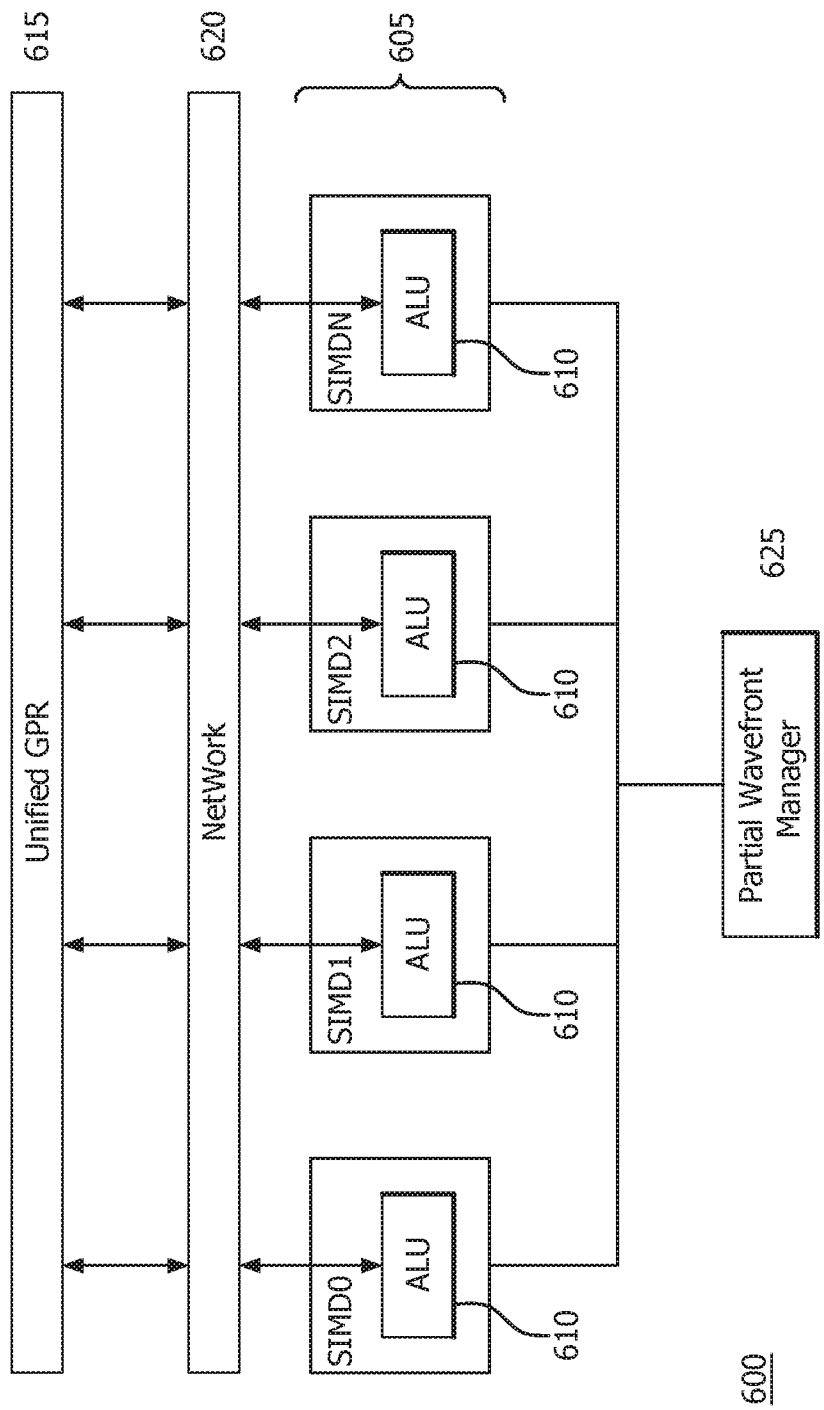
FIG. 6 is a block diagram of a system which performs partial wavefront merging in accordance with certain implementations.

FIG. 6 is a block diagram of system 600 which performs partial wavefront merging in accordance with certain implementations. As stated herein, the description can be extended to other implementations without departing from the scope of the description. System 600 includes SIMD unit(s) 605, for example, SIMD0, SIMD1, SIMD2, . . . , SIMDN, where each SIMD units(s) 605 includes at least one arithmetic logic unit (ALU) 610. System 600 further includes a unified GPR 615 which is connected to each ALU 610 via a network 620. In an implementation, the network 620 is a mesh network. In another implementation, the unified GPR 615 is connected via a shared bus. A partial wavefront manager 625 is connected to each of SIMD0, SIMD1, SIMD2, . . . , SIMDN. The system 600 shown in FIG. 6 is implementable with the systems shown in FIGS. 1 and 2 and the elements presented therein. The partial wavefront merger feature in the system 600 can be enabled or disabled by register settings. A built-in function is added to an instruction set to set this register. The register setting can be set by a driver, shader program or kernel. In general, system 600 operates as described with respect to method 400 of FIG. 4 and method 500 of FIG. 5.

In an illustrative example, a shader unit or program uses a built-in register function to enable the partial wavefront merger functionality. In an example, a wavefront contains 8 work items and consequently, the execution mask is 8 bits. Assume that a wavefront 0 in SIMD0 has an execution mask of 0x11110000, (where a 1 indicates an active lane and a 0 indicates an inactive lane), a stateId of 0, and a program counter equal to 10, and a wavefront 1 in SIMDN has an execution mask 0x00001111, and a program counter equal to 12. In this illustrative example, wavefront 0 has 4 active lanes and wavefront 1 has 4 active lanes. The program counter distance between wavefront 0 and wavefront 1 is 2, which is within the program counter threshold of 4. The partial wavefront manager detects both wavefronts as candidates for merger and moves wavefront 1 from SIMDN to SIMD0 since the total number of active lanes combined is 8 and fits into a single SIMD unit. As wavefront 1 is being moved from SIMDN to SIMD0, wavefront 0 is still executing. Consequently, once the move is completed, the program counter for wavefront 0 becomes 14 and the program counter for wavefront 1 remains 12.

The arbitration algorithm enables wavefront 1 to run in SIMD0 to try to synchronize the two program counters at 14. If the program counter of wavefront 1 skips 14 due to branching or similar program execution, then the partial wavefront manager returns wavefront 1 to SIMDN. If the two program counters are successfully synchronized, then the partial wavefront manager merges wavefront 0 and wavefront 1 into a merged wavefront. The execution mask of the merged wavefront is 0x11111111, indicating all active lanes. As described herein, the work items from original wavefront 0 access unified GPR inside SIMD0 while the work items from original wavefront 1 access unified GPR in SIMDN via a network. Once the merged wavefront completes, its allocated GPRs among the SIMDs are released. As stated herein, the description can be extended to other implementations without departing from the scope of the description.

In another illustrative example, a driver sets a register to enable the partial wavefront merger functionality. In an example, a wavefront contains 16 work items and consequently, the execution mask is 16 bits. Assume that a wavefront 0 in SIMD0 has an execution mask of 0x1111111100000000, a stateId of 0, and a program counter equal to 10, and a wavefront 1 in SIMD2 has an execution mask of 0x1111111100000000, and a program counter equal to 12. The program counter distance between wavefront 0 and wavefront 1 is 2, which is within the program counter threshold of 4. The partial wavefront manager detects both wavefronts as candidates for merger and moves wavefront 1 from SIMD2 to SIMD0 as the total number of active lanes 16 and fits into one SIMD unit. As wavefront 1 is being moved from SIMD2 to SIMD0, wavefront 0 is still executing. Consequently, once the move is completed, the program counter for wavefront 0 becomes 14 and the program counter for wavefront 1 remains 12.

The arbitration algorithm enables wavefront 1 to run in SIMD0 to try to synchronize the two program counters at 14. If the program counter of wavefront 1 does not equal 14, a time out counter is increased. If the time out counter is greater than a time out threshold, then the partial wavefront manager moves wavefront 1 back to SIMD2. If the two program counters are successfully synchronized, then the partial wavefront manager merges wavefront 0 and wavefront 1 into a merged wavefront. The execution mask of the merged wavefront is 0x1111111111111111. As described herein, the work items from original wavefront 0 access unified GPR inside SIMD0 while the work items from original wavefront 1 access unified GPR in SIMD2 via a network. Once the merged wavefront completes, its allocated GPRs among the SIMD units are released. As stated herein, the description can be extended to other implementations without departing from the scope of the description.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing system, comprising:
a plurality of processing units, each processing unit executing a plurality of work items constituted as a wavefront;
a partial wavefront manager in communication with each of the plurality of processing units; and
a unified register structure in communication with each of the plurality of processing units,
wherein the partial wavefront manager is configured to:
detect wavefronts in different processing units which are partial wavefronts, wherein a partial wavefront includes inactive work items and active work items;
move the partial wavefronts from the different processing units into a processing unit from the plurality of processing units; and
merge the partial wavefronts into a merged wavefront that is executed by the processing unit in response to determining that the execution of each of the partial wavefronts are synchronized within a threshold, and
wherein each work item in the merged wavefront accesses register space in the unified register structure previously allocated to the different processing units during execution of the merged wavefront by the processing unit.

2. The processing system of claim 1, further comprising:
a communication network in communication with the unified register structure and the plurality of processing units.

3. The processing system of claim 2, wherein the unified register structure is a plurality of registers, and each processing unit includes a register, which is connected to the communication network.

4. The processing system of claim 1, wherein the unified register structure is a plurality of registers, and each processing unit includes at least one register, which is connected to a communication network that is connected to the plurality of processing units.

5. The processing system of claim 1, wherein the partial wavefront manager records for each wavefront:
which wavefronts are sharing a given program;
an execution mask to identify the active work items; and
a program counter to indicate which instruction is being executed.

6. The processing system of claim 5, wherein the partial wavefront manager further determines if a total number of the active work items exceed a maximum number of work items that can execute with respect to a wavefront.

7. The processing system of claim 5, wherein the partial wavefront manager further determines if program counters associated with the wavefronts sharing the given program are within a certain threshold.

8. The processing system of claim 5, wherein the partial wavefront manager further synchronizes the program counters of the partial wavefronts to within a certain synchronization threshold.

9. A method for improving wavefront processing in a processing system, the method comprising:
determining partial wavefronts from among a plurality of different processing units, wherein each processing unit is executing a plurality of work items constituted as a wavefront, and wherein a partial wavefront includes inactive work items and active work items;
moving the partial wavefronts from the different processing units into a processing unit from the plurality of processing units; and
merging the partial wavefronts into a merged wavefront that is executed by the processing unit in response to determining that the execution of each of the partial wavefronts are synchronized within a threshold,
wherein each work item in the merged wavefront accesses register space in a unified register structure previously allocated to the different processing units during execution of the merged wavefront.

10. The method of claim 9, the method further comprising:
communicating between the plurality of processing units and the unified register structure via a communication network.

11. The method of claim 10, wherein the unified register structure is a plurality of registers, and each processing unit includes at least one register, which is connected to the communication network.

12. The method of claim 9, wherein the determining partial wavefronts further comprises:
recording for each wavefront:
which wavefronts are sharing a given program;
an execution mask to identify the active work items; and
a program counter to indicate which instruction is being executed.

13. The method of claim 12, wherein the determining partial wavefronts further comprises:
   determining if a total number of the active work items exceeds a maximum number of work items that can execute with respect to a wavefront.

14. The method of claim 13, wherein the determining partial wavefronts further comprises:
   determining if program counters associated with the wavefronts sharing the given program are within a certain threshold.

15. The method of claim 14, the method further comprising:
   synchronizing the program counters of the partial wavefronts to within a certain synchronization threshold.

16. The method of claim 15, the method further comprising:
   moving the partial wavefronts back to originating processing units if synchronization fails.

17. The method of claim 16, the method further comprising:
   releasing the register space in the unified register structure upon completion.

18. A method for improving wavefront processing in a processing system, the method comprising:
   executing a plurality of wavefronts in parallel using an associated number of processing units, wherein each wavefront includes a plurality of work items;
   detecting if any of the plurality of wavefronts are partial wavefronts, wherein a partial wavefront includes inactive work items;
   moving the partial wavefronts from different processing units into a processing unit from the plurality of processing units; and
   merging the partial wavefronts into a merged wavefront that is executed by the processing unit in response to determining that the execution of each of the partial wavefronts are synchronized within a threshold,
   wherein each work item in the merged wavefront accesses register space in a unified register structure previously allocated to the different processing units during execution of the merged wavefront.

19. The method of claim 18, wherein the detecting further comprises:
   recording for each wavefront:
      which wavefronts are sharing a given program;
      an execution mask to identify the active work items; and
      a program counter to indicate which instruction is being executed;
   determining if a total number of the active work items exceeds a maximum number of work items that can execute with respect to a wavefront; and
   determining if program counters associated with the wavefronts sharing the given program are within a certain threshold.

20. The method of claim 19, the method further comprising:
   synchronizing the program counters of the partial wavefronts to within a certain synchronization threshold;
   moving the partial wavefronts back to originating processing units if synchronization fails; and
   releasing the register space in the unified register structure upon completion.

* * * * *